United States Patent [19]

Meck et al.

[11] Patent Number: 5,813,004
[45] Date of Patent: Sep. 22, 1998

[54] PARTITIONING AND SORTING LOGICAL UNITS OF DATA PRIOR TO REACHING AN END OF THE DATA FILE

[75] Inventors: David Lee Meck, Hyde Park; Will Joseph Roden, Jr., Apalachin, both of N.Y.

[73] Assignee: International Business Machines Corporation, Armonk, N.Y.

[21] Appl. No.: 533,474

[22] Filed: Sep. 25, 1995

[51] Int. Cl.⁶ ..................................................... G06F 17/30
[52] U.S. Cl. .................................. 707/7; 707/1; 707/10; 395/680
[58] Field of Search .................................... 395/600, 607, 395/680; 707/7, 1, 10

[56] References Cited

U.S. PATENT DOCUMENTS

| 4,510,567 | 4/1985 | Chang et al. | 707/7 |
| 4,809,158 | 2/1989 | McCauley et al. | 707/7 |
| 5,274,805 | 12/1993 | Ferguson et al. | 707/7 |
| 5,398,337 | 3/1995 | Ito | 707/8 |
| 5,421,007 | 5/1995 | Coleman et al. | 707/7 |
| 5,487,164 | 1/1996 | Kirchhofer et al. | 707/7 |

OTHER PUBLICATIONS

David Dewitt et al., "Parallel Database Systems: The Future of High Performance Database Systems", Communications of ACM, vol. 35, No. 6, Jun. 1992.

J.P. Loftis, "Providing Dynamic Sorting and Searching Capabilities Using SQL forms", Information Science Abstracts, p. 11, Jun. 1990.

Archie Charles McKellar, assigned to International Business Machines; "Sort Process"; Defensive Publication No. T913, 007, published Aug. 14, 1973 (913 O.G. 393).

Primary Examiner—Thomas G. Black
Assistant Examiner—Greta L. Robinson
Attorney, Agent, or Firm—Marc A. Ehrlich, Esq.; Heslin & Rothenberg, P.C.

[57] ABSTRACT

A data partitioning technique for use in sorting data records of a data file. A plurality of data records is retrieved from the file until a trigger condition is satisfied. For example, data is retrieved until a trigger field within the plurality of data records changes from one value to another value, or until a comparison of the trigger field, using a conditional operator, to a predetermined value is satisfied, or until the trigger field changes from one value to another value after a predetermined number of data records is retrieved. After the trigger condition is satisfied, one or more of the retrieved data records are sorted. The sorted records are then available for output prior to reaching the end of the file.

5 Claims, 4 Drawing Sheets fig. 1 fig. 3 fig. 4 fig. 2 fig. 5 fig. 6 fig. 7

PARTITIONING AND SORTING LOGICAL UNITS OF DATA PRIOR TO REACHING AN END OF THE DATA FILE

TECHNICAL FIELD

This invention relates in general to the sorting of data and, in particular, to partitioning the data into a plurality of partitions and then sorting the partitions such that a sorted partition is available for output prior to reaching an end of the data file.

BACKGROUND ART

The process of sorting data is very important in data processing and, in particular, it is important in the processing of commercial and scientific processes. In both types of processes, clock time can be a critical factor in providing end results. In both types of processing, use and availability of computing resources is a critical factor, which directly affects meeting deadlines. In both types of processes, there has been an ever increasing need of accuracy in end results and an ever increasing volume of data to support the production of end results. Consequently, sorting of data is taking considerable time and resources in the commercial and scientific computing environments.

There are several ways to approach the problem of reducing time and resources for sorting data. These approaches include improving sorting techniques, integrating sorting functions in hardware, enabling parallel sorting, and providing better use of computing resources (e.g., in-memory sorts, faster I/O paths, and processors dedicated to sorting).

Another technique for reducing the time and resources used in sorting includes using a sort process as a stage in a pipeline with the input to sort being read from a pipe and the output from sort being written to the pipe. This method reduces I/O latencies inherent in the use of peripheral storage and enables some reduction in elapsed time by providing for parallelism with the process that writes the data to sort and sort input phase processing, and between the sort output phase and the process that reads the sorted data.

However, a need still exists for a mechanism to enhance parallelism for the entire sorting process, thereby, reducing the elapsed time. In particular, a need exists for enabling the writer to sort (e.g., Process A), the sort (SORT), and the reader of the sorted data (e.g., Process B) to execute in parallel, thus, improving the elapsed time of the entire process. A need also exists for further reducing the resources necessary to perform a sort, and to reduce the number of records sorted at one particular time.

SUMMARY OF THE INVENTION

The shortcomings of the prior art are overcome and additional advantages are provided through the provision of a method for partitioning data retrieved from a data file. A plurality of data records is retrieved from the data file until a trigger condition is satisfied. When the trigger condition is satisfied, at least a portion of the retrieved data records is sorted. Thereafter, the sorted data records are available for output prior to reaching an end of the data file.

As examples, the trigger condition includes a trigger field within the plurality of data records changing from one value to another value; a comparison of the trigger field, using a conditional operator, to a predetermined value; the trigger value changes from one value to another value after a predetermined number of data records is retrieved; or a comparison of the trigger field, using a conditional operator, to a predetermined value is made after a predetermined number of records is retrieved.

In another embodiment of the invention, the sorted data records are output to a storage medium or to a process prior to reaching the end of the data file. In a further embodiment, the retrieving, sorting and outputting are iteratively performed until the entire data file is retrieved, sorted and outputted.

In yet a further embodiment of the invention, all of the retrieved data records, except for the one causing the trigger condition to be satisfied, are stored in a buffer. The buffered data records are then sorted prior to reaching the end of the data file.

In another embodiment of the invention, a first process retrieves a plurality of data records from an input file and passes the plurality of data records to a pipe. A second process extracts from the pipe at least a portion of the plurality of data records until a trigger condition is satisfied. The second process also sorts one or more of the extracted data records and outputs the sorted records to the pipe prior to reaching an end of the input file. The outputted sort is then available for retrieval by a third process.

In a further embodiment, a data partitioning method is provided in which a trigger condition is used to partition data records retrieved from a data file into a plurality of logical units of data. At least one of the logical units of data is then sorted and made available for output prior to reaching an end of the data file.

In another aspect of the invention, a system for partitioning data retrieved from a data file is provided. The system includes means for retrieving a plurality of data records from the data file until a trigger condition is satisfied, and means for sorting at least a portion of the retrieved data records. The sorted data records are then available for output prior to reaching an end of the data file.

In a further aspect of the invention, a data partitioning system is provided. The system includes means for using a trigger condition to partition data records retrieved from a data file into a plurality of logical units of data, and means for sorting at least one of the logical units of data. The sorted logical unit(s) of data is available for output prior to reaching an end of the data file.

The data partitioning technique of the present invention advantageously enables the data records of a data file to be partitioned and the partitions to be sorted prior to the end of the data file. By partitioning the data, smaller units of data are created for the actual sort. The smaller units of data, once sorted, can be written out to output media or output to another process. The dynamic partitioning and sorting of data prior to receipt of the end of file enables parallelism to occur between the process creating the data to be sorted, the sorting and the process reading and operating on the sorted data. Since the unit of data being sorted is on the order of the size of the largest unit of data contained in the file and not the size of the entire file, some of the resources required by the sort are reduced proportionately. Specifically, the present invention enables sorting to occur, substantially concurrently with the input the data and the processing of the sorted data.

The data partitioning sorting technique of the present invention advantageously reduces the elapsed time of the sort, reduces CPU time for the sort, reduces I/O requests for the sort, reduces in-memory requirements for the sort and reduces sort work space.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a partitioning technique is provided for partitioning the data records of a data file into logical units of data, and sorting and outputting the logical units prior to reaching the end of the data file.

Figure 1:
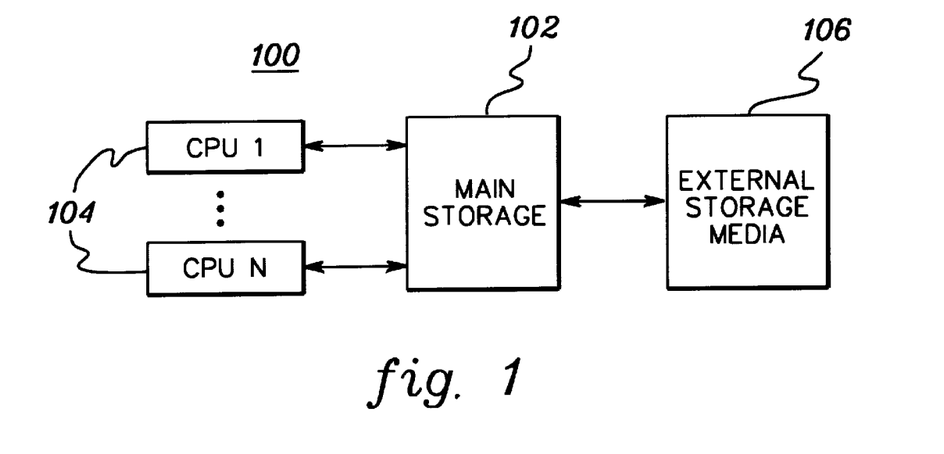
FIG. 1 depicts one example of a computer system incorporating and using the partitioning technique of the present invention.

In one embodiment, the partitioning technique of the present invention is incorporated and used in a computer system 100 (FIG. 1). In one example, computer system 100 is designed following the Enterprise Systems Architecture (ESA)/390 offered by International Business Machines Corporation (e.g., an ES/9000 Model 982). Enterprise Systems Architecture/390 is described in detail in "Enterprise Systems Architecture/390 Principles of Operation," Publication Number SA22-7201-02, Third Edition (February 1995), which is offered by International Business Machines Corporation, and is hereby incorporated herein by reference in its entirety. (ESA/390 is a trademark of International Business Machines Corporation.)

As shown in FIG. 1, computer system 100 includes, for example, a main storage 102, one or more central processing units (CPUs) 104 and one or more external storage medium 106. Each of these components is described in detail below.

Central processing units 104 contain the sequencing and processing facilities for instruction execution, interruption action, timing functions, initial program loading and other machine related functions. In one embodiment, one or more of central processing units 104 executes an operating system, such as, for example, the Multiple Virtual Storage (MVS)/ESA operating system, offered by International Business Machines Corporation. (MVS/ESA is a trademark of International Business Machines Corporation.) As is known, MVS/ESA controls the execution of programs running within the system and the processing of data. Additionally, in accordance with the principles of the present invention, MVS/ESA also controls the partitioning technique of the present invention.

One or more subsystems can run under the control of MVS/ESA. One example of a subsystem running on MVS/ESA and incorporating the partitioning technique of the present invention is IBM BatchPipes/MVS (hereinafter referred to as BatchPipes). BatchPipes is described in detail in "BatchPipes/MVS", Publication Number GC28-1215-00, First Edition, June 1994, which is offered by International Business Machines Corporation, and is hereby incorporated herein by reference in its entirety. (IBM and BatchPipes/MVS are trademarks of International Business Machines Corporation.)

Central processing units 104 are coupled via, for example, one or more bi-directional buses to main storage 102. Main storage 102 is directly addressable and provides for high-speed processing of data by the central processing units. Main storage 102 can be physically integrated with the CPUs or constructed as stand-alone units.

Main storage 102 is further coupled via, for instance, a bi-directional bus to external storage media 106. External storage media 106 may include, for instance, direct access storage devices (DASD), magnetic tapes, diskettes, and/or optical devices, to name a few.

Figure 2:
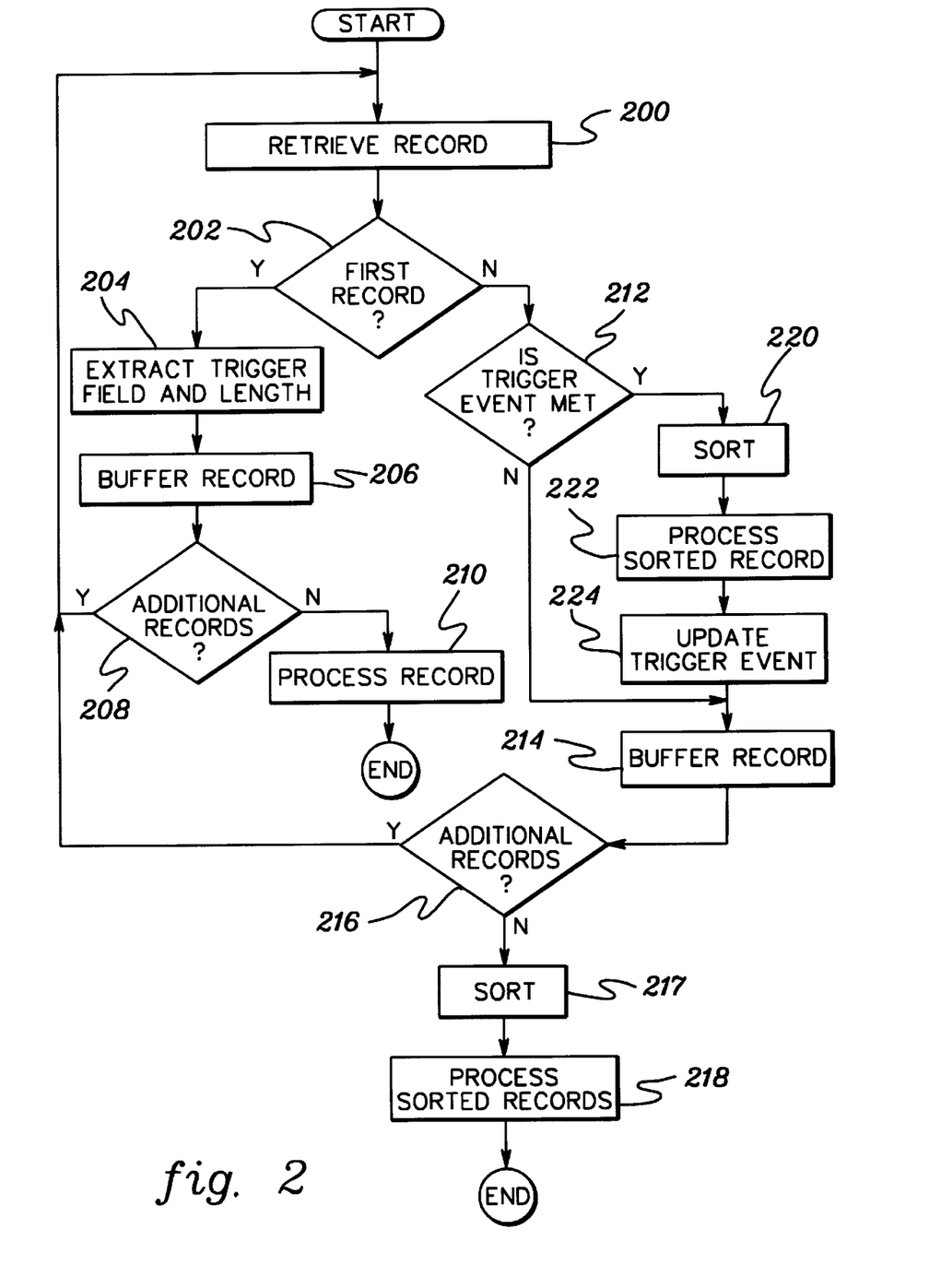
FIG. 2 depicts one embodiment of the logic associated with one example of the data partitioning technique of the present invention.

One example of the logic associated with one embodiment of the data partitioning technique of the present invention is described in detail with reference to FIG. 2. Referring to FIG. 2, initially, a data record is retrieved from a data file stored, for instance, in main storage 102 (e.g., in a buffer or in a pipe) or on an external storage medium 106, STEP 200 "RETRIEVE RECORD." In one embodiment, if this is the first data record retrieved, INQUIRY 202 "FIRST RECORD?," then a flag is set, indicating that the first record has been retrieved, and the value stored in a particular field within the data record is retrieved for use in determining when sorting is to take place, STEP 204 "EXTRACT TRIGGER FIELD AND LENGTH." In particular, in one example, the value stored in a prespecified trigger field within the data record is saved and compared with values stored in trigger fields of other retrieved records to determine when sorting is to occur. As used herein, the saved value is referred to as the compare value. In one instance, the user determines what position or positions in the record is to be considered the trigger field.

In addition to extracting the trigger field and its length, the first record is buffered in main storage 102 or on one or more of external storage media 106, STEP 206 "BUFFER RECORD." As described below, the buffered data records are considered a logical unit of data and will be sorted together.

Subsequently, a determination is made as to whether there are any more records in the data file, INQUIRY 208 "ADD'L RECORDS?" If there are no more records, then the buffered data record is processed, STEP 210 "PROCESS RECORD." In particular, the buffered data record is outputted to a storage medium (such as, e.g., tape, DASD, a buffer or a pipe), or it is passed to another process for processing. However, if there are additional records to be retrieved, then processing continues with STEP 200 "RETRIEVE RECORD."

Assuming the next retrieved record is not the first record, INQUIRY 202 "FIRST RECORD?," processing continues with INQUIRY 212 "IS TRIGGER EVENT MET?". In one example, to determine whether the trigger event is satisfied, the compare value is compared to the value of the trigger field of the newly retrieved record. If the compare value is equal to the value of trigger field, then a trigger does not occur and the trigger event is not satisfied. However, if the compare value is not equal to the trigger field value, then the trigger condition is satisfied.

When the trigger event is not met, the retrieved record is simply buffered, STEP 214 "BUFFER RECORD," and a check is made to see if there are additional records to be retrieved, INQUIRY 216 "ADD'L RECORDS?". Should there be additional records, then processing continues with STEP 200 "RETRIEVE RECORD." However, if there are no more records to be retrieved, then assuming there is more than one buffered record, the buffered records are sorted, STEP 217 "SORT," and the sorted records are processed, STEP 218 "PROCESS SORTED RECORDS," as described below.

Returning to INQUIRY 212 "IS TRIGGER EVENT MET?", if the compare value is unequal to the trigger field value of the last retrieved record, then the trigger condition is satisfied. This indicates, in accordance with the principles of the present invention, that the buffered records are a logical unit of data to be sorted. Thus, the buffered data records are sorted on one or more fields, STEP 220 "SORT." In one embodiment, the buffered records are sorted on the data field, which includes the trigger field, as well as on one or more other data fields. In another embodiment, the buffered data is sorted just on a data field other than the one that includes the trigger field. Alternatively, the buffered data records are sorted on multiple fields. The sort technique used does not have to be a particular sort technique. The present invention can employ or be used with any sorting technique.

Once the buffered data records (i.e., the logical unit of data) are sorted, then the sorted data records can be further processed, STEP 222 "PROCESS SORTED RECORDS." For example, the sorted records can be outputted to a storage medium (e.g., tape, DASD, a pipe or a buffer), or passed to another process for use by that process.

In accordance with the principles of the present invention, the sorted records do not have to be concatenated or merged with other records in order to complete the sort. The sort of the logical unit of data is complete when the sort process terminates for that logical unit. The sorted logical unit of data can then be processed (e.g., outputted) prior to reaching the end of the data file and independent of any other records in the data file.

In addition to the above, the compare value is changed to reflect the value of the trigger field of the last retrieved record, STEP 224 "UPDATE TRIGGER EVENT." That is, the value of the trigger field that caused the trigger is saved as the compare value in order to be used during further comparisons. Subsequent to updating the compare value, the last retrieved data record is buffered for sorting when another trigger event is satisfied, STEP 214 "BUFFER RECORD." Processing then continues with INQUIRY 216 "ADD'L RECORDS."

It will be apparent to those of ordinary skill in the art that the above-described flow is only one example. There can be many variations to the above, including, for instance, processing more or less than the functions described above, or changing the order of some of the functions without departing from the spirit of the invention. These variations are therefore, considered a part of the claimed invention.

Additionally, in the above example, the trigger condition is satisfied when there is a change in the trigger field. This is only one example. Other trigger conditions are possible and are considered a part of the claimed invention. For example, the trigger condition can include using a conditional operator (e.g., equal, not equal, less than, less than or equal, greater than, or greater than or equal) to compare the value in the trigger field of the retrieved record with a predetermined value to determine if sorting should take place. As another example, the trigger condition can include a change in the trigger field after a prespecified number of records is retrieved. (Each of these examples is described in further detail below.)

Any changes to the logic diagram of FIG. 2 needed to incorporate the other trigger conditions described above, as well as any other trigger conditions, will be apparent to those of ordinary skill in the art. For example, for the conditional operator example, it is possible to eliminate STEPs 202, 204, 206, 208 and 210, and instead begin with STEP 212 after retrieving the record. That is, after the record is retrieved, a determination is made as to whether the condition is satisfied. For instance, if the trigger condition is such that a trigger will occur when the value of the trigger field is greater than a particular number (as just one example), then after the record is retrieved, STEP 200, the comparison is made, INQUIRY 212. Should the trigger field be less than the particular number, then the record is buffered, STEP 214. If it is greater than the particular number, then the buffered records are sorted, STEP 220.

Similarly, the logic flow can be adapted for any of the other trigger conditions, as will be apparent to those of ordinary skill in the art. These variations are therefore, considered a part of the claimed invention.

In accordance with the principles of the present invention, records can be retrieved from a data file, sorted and outputted even though the end of the data file has not been reached. This allows processes to run in parallel, thereby reducing the elapsed time for sorting an entire data file. Additionally, by partitioning the data file and sorting on smaller amounts of data at a time, system resources can be better utilized.

Figure 3:
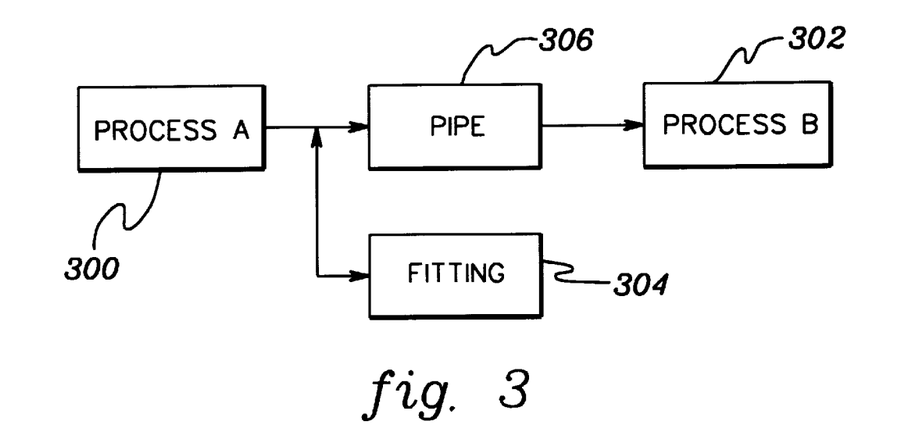
FIG. 3 illustrates one example of a process configuration having a fitting, which includes the data partitioning technique of the present invention.

One example of two processes being able to run in parallel due to the inclusion of the partitioning technique of the present invention is described herein with reference to FIG. 3. Referring to FIG. 3, a first process 300, Process A, is coupled to a second process 302, Process B, via a pipe 306. Pipe 306 is, for example, a storage buffer that receives data and has data extracted therefrom. Pipes are explained in detail in "BatchPipes/MVS", Publication Number GC28-1215-00, First Edition, June 1994, which is offered by International Business Machines Corporation, and is hereby incorporated herein by reference in its entirety. Additionally, a fitting 304 is logically disposed between Process A and pipe 306. In one embodiment, fitting 304 is an attachment between Process A and pipe 306, and includes the data partitioning and sorting techniques of the present invention. In one example, fitting 304, while being an attachment to Process A, runs independent of and transparent to Process A, but uses the same system resources as Process A. Fittings and pipes are described in further detail in co-pending, commonly owned U.S. patent application entitled "Data Adapter," Ser. No. 08/426,592 now U.S. Pat. No. 5,732,269, filed Apr. 21, 1995, which is hereby incorporated herein by reference in its entirety.

In operation, Process A retrieves data records from an input file and passes the data records to pipe 306. Thereafter, fitting 304 extracts the data records from pipe 306, in accordance with the principles of the present invention. In particular, fitting 304 retrieves the data records from, for example, a data file within pipe 306 and stores the data records in a buffer until a prespecified trigger condition is satisfied. (In one example, the last record retrieved, which is the one causing the trigger is not stored in the buffer until the sort of the other records in the buffer is complete.) As one specific example, the fitting retrieves records from the pipe file until the trigger field changes value. That is, assume the pipe has three data records, SMITH, SMITH and SMYTHE, and the trigger field is the first three positions within each record, then the fitting retrieves data records until the trigger field changes from SMI to SMY. When the prespecified trigger condition is satisfied, then the buffered records are sorted. When the sort is complete, the fitting outputs the sorted records to pipe 306 prior to reaching an end of the input or data file. Process B can then commence retrieving and processing the sorted records as soon as they are placed in the pipe, without waiting for all of the records to be written to the pipe.

In accordance with the principles of the present invention, Process B is executing substantially concurrently with Process A and the fitting. That is, Process B begins retrieving records after Process A (and the fitting) has completed the first sort, and then executes concurrently with Process A (and the fitting) until Process A terminates. One example of this concurrent processing is shown in a timeline depicted in FIG. 4. The timeline includes the execution time for Process A and Process B. There is no separate timeline for the fitting, since the elapsed time for the fitting is included in the time for Process A. This is because the fitting uses the same resources as Process A, even though it runs independent of and transparent to Process A.

Figure 5:
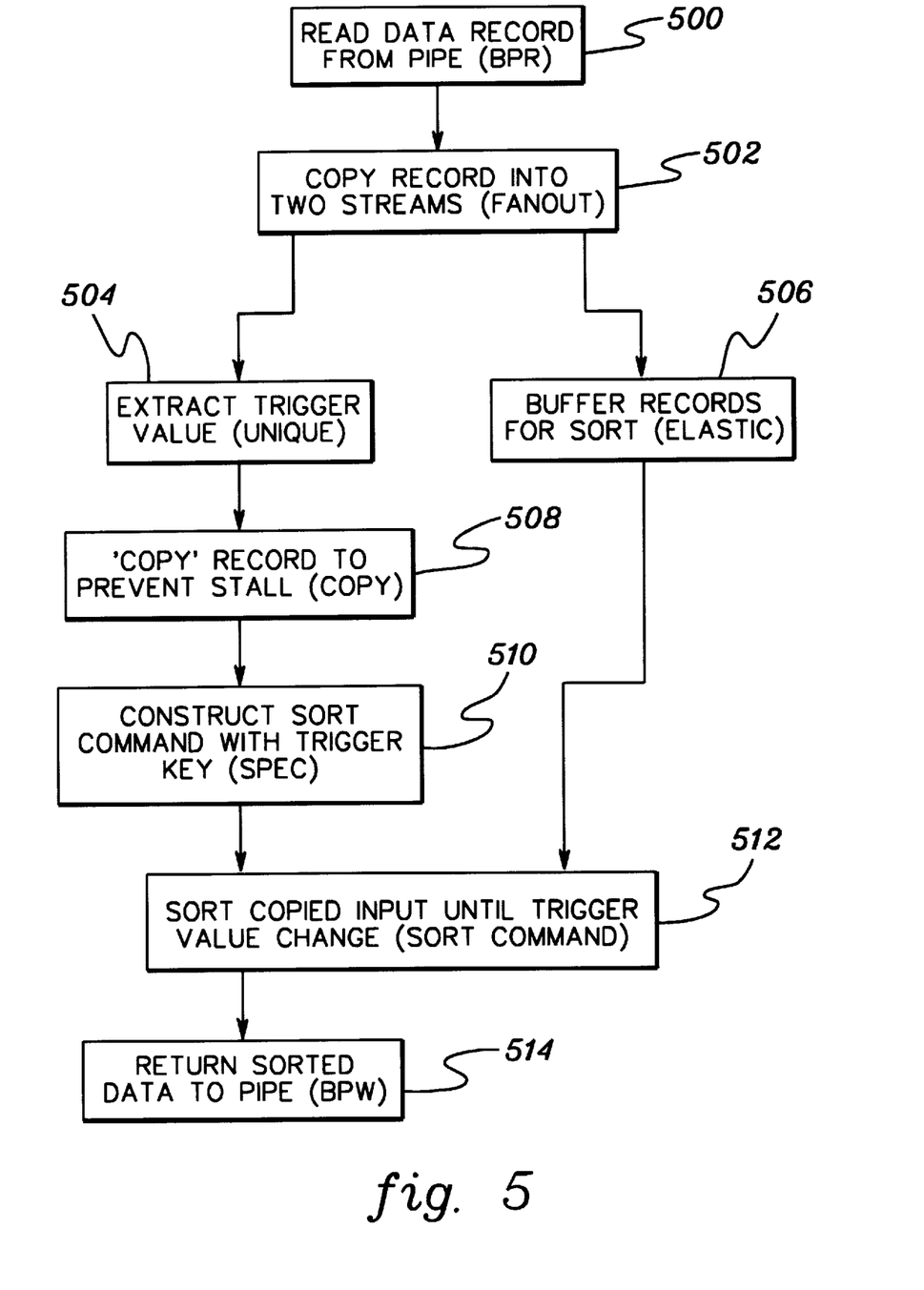
FIG. 5 depicts one example of a data flow diagram of one embodiment of the data partitioning technique of the present invention.

One example of a data flow diagram implementing the partitioning technique of the present invention within a fitting (or data adapter) is shown in FIG. 5 and described in detail below. Each block within the diagram represents, for instance, a functional stage in a BatchPipeWorks pipeline. (As one example, the particular functional stage is indicated in parenthesis within each block.) BatchPipeWorks is a feature of IBM BatchPipes/MVS, which provides a data flow language implemented using pipelines and a mechanism to execute the data flow language as an extension of the application (i.e., either a pre or post process function acting on data outside the application (e.g., a data adapter described in the above-referenced co-pending U.S. application, Ser. No. 08/426,592 now U.S. Pat. No. 5,732,269, filed Apr. 21, 1995, which is hereby incorporated herein by reference in its entirety)). The function performed in this one particular example is to extract data from a pipe via a fitting and sort the data on two data fields for a set of records already sorted on a third, higher order data field and pass the sorted data downstream through the pipe. In this particular example, the data field on which the records are presorted is in columns 2–3 (this is also the trigger field), and the unsorted data fields are in columns 5–6 and 8–9.

Referring to FIG. 5, initially a data record is read from the pipe, STEP 500 "READ DATA RECORD FROM PIPE." The record retrieved from the pipe is copied into two streams of data flow, STEP 502 "COPY RECORD INTO TWO STREAMS." In one embodiment, the record is copied to a first stream, which in FIG. 5 is the stream on the left, and then it is passed to the right stream. After the right stream receives the record, it informs the pipe that another record can be retrieved. In one example, the first stream of the data flow obtains the record, determines when a trigger condition is satisfied, constructs the sort command with the trigger key, passes the sort command to the sorting technique, and returns the sorted data to the pipe. The second data stream buffers the records for the sort and performs the sort.

Subsequent to retrieving the record, the trigger value is retrieved by the first stream to determine if the trigger condition, which in this particular example is a change in the trigger value, is satisfied, STEP 504 "EXTRACT TRIGGER VALUE." When the condition is not satisfied, the righthand stream buffers the records until the sort takes place. However, when the condition is satisfied the record is passed to STEP 508 "'COPY' RECORD TO PREVENT STALL." In this step, a message is sent back up to STEP 504, indicating that it has received the trigger. Thereafter, the sort command with the trigger key is constructed, STEP 510, and the constructed sort command is passed to the sort, STEP 512. Additionally, the buffered records are passed to the sort. Subsequent to receiving the sort command and the buffered records, the sort is performed within the second data flow, STEP 512, and then, the sorted data is returned to the pipe via the first data flow, STEP 514.

One example of the BatchPipeWorks language used to accomplish the above implementation is described below. In the below language, the "|" (vertical bar) is used as a stage separator to separate stage commands and indicates that data is piped between the stages (piping in this case is done by passing a pointer to the record to the next stage). In the above data flow diagram, there are two pipelines specified, one pipeline to get the record, discern the change in the trigger data field value and to create a pipeline (e.g., a command) to sort the logical unit of data; the second pipeline buffers the records, and performs the sort using the pipeline created by the first pipeline. The pipelines are constructed based on the two different data streams indicated by the data flow through the boxes of FIG. 5. The endchar (end character) is used in the language to indicate the end of the pipeline ("?" is used in this example). The pipeline created and then executed via the callpipe/pipcmd uses a stage separator different from the "-" to allow for correct parsing of the pipeline specifications. In this example, the second stage separator used is the "@" (at sign). Some of the commands and concepts recited below are described in further detail after the illustrated language.

```
(endchar ?)
  | BPR                /* takes record from
                          BatchPipes pipe
  |f:fanout            /* makes two copies of
                          each record
  | unique 2–3         /* passes on record when
                          next unique data field
                          value is found
  | copy               /* consumes record to
                          prevent a pipeline
                          stall
  | specs              /* creates command to sort
                          data
      /callpipe (stagesep @) *.input.1:
      @ zone 2–3 whilelabel/⎺1 2–3 nw
      /@ sort 5–6 8–9
      @ *: n
  |p:pipcmd            /* executes sort and takes
                          copied records
  | BPW                /* returns record to
                          BatchPipes pipe
  ?f:                  /* end pipcmd stage,
                          receive fanout records
  | elastic            /* buffers records for
                          sort
  |p:                  /* buffers to be read by
                          the pipcmd stage
```

One example of the pipeline created by the specs command is defined below. For consistency, the "@" (at sign) stage separator has been changed to the "|" (vertical bar) for displaying the created pipeline.

```
*.input.1:
| zone 2–3 whilelabel 2–3
```

-continued

```
| sort 5–6 8–9
    *:
        /* read from secondary input stream from
        previous stage
        /* while data in columns 2–3 does not change
        /* pass EOF to sort when data changes
        /* sort on fields in columns 5–6 and 8–9
        /* when EOF received from previous stage
```

Some commands and concepts in the above example have the following meaning:

endchar End character used to indicate the end of a BatchPipeWorks pipeline.

Stream Input or output flow of data (indicated top down by the arrows between the boxes in the example of the flow diagram of FIG. 5.)

BPR BatchPipes Read—Extract data from the pipe.

fanout Make copies of data and send to label associated with fanout. Record is copied to next stream, when last stream indicates it is done with the record(s).

unique Takes records until key field changes, discards all records except last record for previous key and passes the record to the next stage.

copy Consumes a record which results in a "done" indication to be passed back through the pipeline.

specs Data editing command used in the above example to:

1) extract the unique key from the record passed to it and insert the key into a pipeline; and 2) construct a pipeline which will read and sort records while a key remains the same.

callpipe Used to indicate a BatchPipeWorks pipeline specification to be executed.

pipcmd Assumes the record passed to it is a BatchPipeWorks pipeline and executes it.

elastic Command which buffers records and passes them on when requested (by a read from the next stage).

*.input.1: Connects the input or the callpipe to the secondary output stream of the previous stage ("*" indicates the connection request, "input" notes a connection to an output stream for input, "1" indicates the input is coming from a secondary output stream (the primary output stream is labelled 0).

*: An output stream connector which attaches the output stream of the sort command to the stage following the pipcmd stage as an input stream (in this example: BPW).

BPW BatchPipes writer—return data to the pipe.

Figure 4:
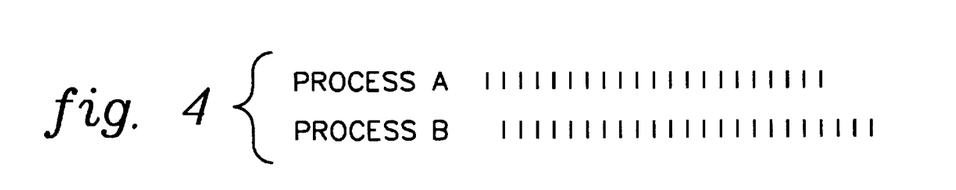
FIG. 4 depicts one embodiment of a process execution timeline for the process configuration of FIG. 3, in accordance with the principles of the present invention.

The use of the fitting, and the piping of the sorted data to Process B in the above-described example advantageously reduces the elapsed time for the sorting process, since the sorted data is made available to Process B as it is being partitioned and sorted. As can be seen in FIG. 4, Process A (including the elapsed time for the fitting) and Process B run substantially concurrently (i.e., they run concurrently except that Process A starts before Process B, and Process B ends after Process A), thereby, reducing the elapsed time. Additionally, resources are better utilized, since less resources are needed to sort a smaller amount of data at a time.

To illustrate the savings in elapsed time, one specific example is described herein. This is only one example. Time savings will vary depending upon, for instance, the type of functions being performed, system resources and/or execution process times. In this one particular example, Process A is reading data that has already been ordered on a high order key. A fitting is used to sort on the high order key and two other keys in the record. Process B takes the sorted data and updates a data base and produces statistical information. In this particular example, 100 million records are being processed by the application, and the elapsed time for the entire process is approximately 24 hours. This is a significant decrease in the amount of time it took to sort the same 100 million records, using a process that did not include the partitioning technique of the present invention, the fitting or the pipe. When the partitioning technique, the fitting nor the pipe was used, the elapsed time to perform the same process was approximately 78 hours.

Figure 6:
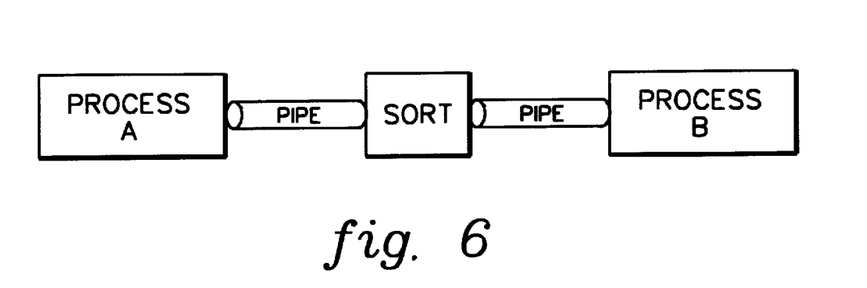
FIG. 6 illustrates another example of a process configuration incorporating and using the data partitioning technique of the present invention.

Taking the example further, if pipes were used between Process A and a Sort process (instead of a fitting) and between the Sort process and Process B (see FIG. 6), but the data partitioning technique of the present invention was missing, the elapsed time to perform the process described above would be approximately 64 hours (as compared to 78 hours when there were no pipes and no data partitioning, and 24 hours when there was data partitioning, pipes and a fitting). The elapsed time did not decrease drastically, since when there is no data partitioning, there is no parallelism between Processes A and B and minimal parallelism between Process A and Sort and Process B and Sort.

Figure 7:
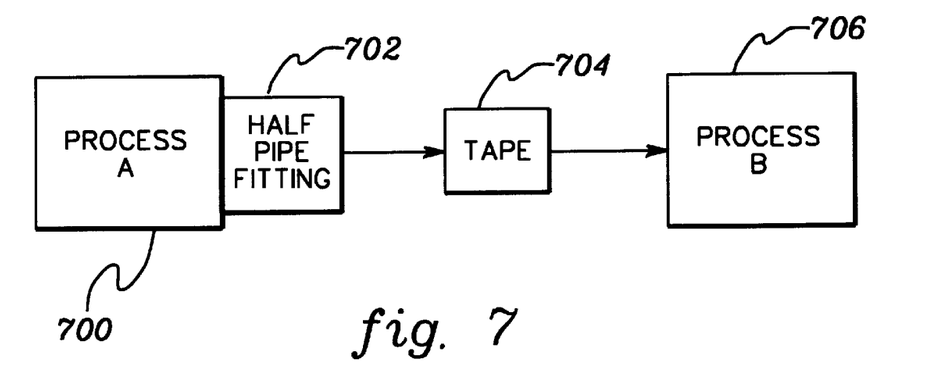
FIG. 7 illustrates one example of a process configuration having a half pipe fitting, which includes the data partitioning technique of the present invention.

In another embodiment of the invention, a half pipe fitting is used instead of a fitting, and in accordance with the principles of the present invention, the data partitioning and sorting take place within the half pipe fitting. As can be seen in FIG. 7, a half pipe fitting 700 is logically disposed between a first process 702, Process A, and a tape 704 (instead of a pipe). Half pipe fitting 702 partitions and sorts the data and outputs the sorted data to tape 704. Thereafter, Process B (706) retrieves the sorted data from the tape.

In one specific example, the specification for the half pipe indicated that the data would be buffered and sorted on the secondary data fields when a change in a high order data field occurs. Then, the sorted data would be output to a tape. This technique advantageously reduced the elapsed time (e.g., 45 hours instead of the 78 hours described above), but not as much as when the fitting was used. It also saved a great deal of DASD storage (e.g., 67,000 cylinders, in one specific example). Some of the elapsed time gains resulted from the sort being able to perform in-memory sorts on relatively small amounts of data. Using the in-memory sort eliminated the I/O costs (CPU and elapsed time) of using sortwork.

The inclusion of the data partitioning technique of the present invention in a fitting or half pipe fitting is exemplary. In other embodiments, fittings are not used at all and instead, the data partitioning technique and associated sort are executed as a separate process or stage in the pipeline (see, e.g., FIG. 6). That is, the data partitioning technique and the associated sorting process use their own system resources (instead of those of, for example, Process A) and they are part of the pipeline. This is advantageous in a pipeline situation in which the pipeline needs to be balanced, and the addition of the elapsed time for the fitting on Process A would surpass the elapsed time for the other processes (e.g., Process B). The use of the separate process or stage in the pipeline enhances the degree of parallelism.

In the above examples, the trigger condition(s) and sorting fields were defined in, for example, the BatchPipeWorks language. This is only one example. There are other alternatives, such as, for instance, coding the conditions and fields in a language other than the BatchPipeWorks language or as another example, including the trigger conditions and sorting fields on control statements to be input into a sort routine.

In one example, in order to incorporate the data partitioning techniques of the present invention into a sort routine, some or all of the following information may be used:

1. A specification of which data fields are previously ordered. In one embodiment, these presorted fields are sorted along with other fields. However, in other embodiments, the presorted fields are not included in the sort.

2. A specification of one or more trigger controls to be used to initiate a sort of buffered data.

3. A specification of the precedence order relationship among the trigger controls to indicate which should take precedence for triggering a sort.

4. An indication of the sort fields and order required associated with a trigger.

5. A mechanism for buffering the input for the data being gathered to be sorted when a trigger condition is satisfied.

Examples of sort and trigger control statements to be used in accordance with the principles of the present invention are described in detail below. Typical sort control statements, which indicate data fields (also called control fields or keys) to be sorted on, include the following information, as one example:

1. Position of the fields within the record.
2. Length of the fields.
3. Data format of the fields.
4. Sorting sequence (i.e., ascending or descending order).
5. Indication of the major and minor control fields.

Usually, the major control field is the first field specified in the control statement, the next data field is the secondary control field, and so on. Data is ordered, based on the first or major control field. If the major control fields are the same, then the data ordering is based on the secondary minor control field, etc. An example of a SORT control statement is as follows (In the below described examples, ascending order and EBCDIC character data format are assumed.):
SORT p.l
where the numbers in the format of p.1 specify the fields to be sorted.
p is used to indicate the position, or offset, in the record where the field begins
l indicates the length of the field
As an example:
SORT 34.5 50.8
Indicates the major control field is at offset 34 for a length of 5, and the minor control field is at offset 50, for a length of 8.

In accordance with the principles of the present invention, a new control card is created to indicate, for instance, which fields are already ordered, and to indicate the order in which the fields are to be examined to trigger a sort. One example of this control card is a TRIGGER control card, in which, in one instance, the parameters on the TRIGGER control statement are in the same format as the parameters on the SORT control statement. In one embodiment, the first parameter specified on the TRIGGER control statement indicates the first field to examine for a trigger condition to trigger a sort, the second parameter specified indicates the second field to inspect for a trigger condition and so on. One example of a TRIGGER control card specifying one trigger condition is as follows:

TRIGGER 34.3

Where TRIGGER 34.3 indicates that the trigger condition is located in position 34 for a length of 3 characters. In one embodiment, this indicates that the data is already ordered in the field starting in position 34 for 3 characters, and that any change in the value in that field will result in the triggering of a sort for the buffered records for the fields specified by a SORT control statement. As used herein, the value in the trigger control field that is compared with the values in the trigger fields of other records is referred to as a compare value. For example, the field beginning in position 34 may be sorted on zip codes, and when the beginning of the zip code goes from the area 125 to the area 126, a sort would be initiated and the compare value changes from 125 to 126. If, for instance, a SORT control card having the parameters SORT 34.5 50.8 followed the TRIGGER control card, then the records buffered up until the point in which the trigger took place, are sorted by the fields starting at 34 for a length of five (e.g., a zip code area) and at 50 for a length of eight, as indicated by the sort arguments. After the sort completes, data is written out to the specified output medium, such as tape, DASD or a pipe, or it is output to another process.

Another example of control statements for the TRIGGER and SORT, are as follows:
TRIGGER 34.5
SORT 50.8

In this example, the input data may be, e.g., presorted on the data field beginning in column 34 for a length of 5 and, again, may be a zip code number. A change in the zip code is the trigger to sort the data. In this case, the TRIGGER field is not specified as a sort field. Instead, the sort field indicates that the data is to be sorted on the field beginning in position 50 for 8 characters, which represents, for instance, an account number.

In a further embodiment, a TRIGGER control statement can also have a major and minor control field. For example, if the data is ordered by more than one data field, the partitioning can be optionally done with two or more trigger control fields. Similarly, even if the data is not preordered, the partitioning can be done with two or more control fields. One example of a TRIGGER control statement with two trigger fields is as follows:
TRIGGER 30.1 40.2

In this case, if there is a change in the major control field (30.1), a sort would be triggered and both data field compare values would be reset (i.e., the values associated with major control field 30.1 and minor control field 40.2). If there is no change in the major trigger field, then the minor field value would be checked. A change in this field would then trigger a sort, but only the minor data field compare value would be reset. There may be one or more trigger control fields specified.

In addition to the above TRIGGER control statements, in which a trigger condition is satisfied when the value of a trigger field changes, there are other examples of TRIGGER control statements, which are described below. One example of a TRIGGER control statement and an associated SORT statement are as follows:
TRIGGER (30.3, CH, >100)
SORT 30.3 22.8

In the above example, at offset 30 in the record for a length of 3, there is a character string (CH) which is being compared to the value specified (100). When the character string in the trigger field is greater than 100, then a sort will be triggered. In this example, the data would be partitioned in only two logical units of data, i.e., all records with a value of less than 100 or equal to 100 in field 30.3, and all records with a value greater than 100 in field 30.3. Both logical units of data would be sorted using the same sort control fields (i.e., 30.3 as the major and 22.8 as the minor). Use of the above trigger assumes the records are ordered. The correct use of the conditional operator is incumbent on the user. As shown above, the data format is specified for this conditional operator so a correct compare can be made.

If a different sort is desired for the second logical unit of data, then an additional SORT control statement is used, with the sort being triggered when end of file is received. For this example, the control statements to the sort program would be:
TRIGGER (30.3, CH, >100)
SORT 30.3 22.8
SORT 30.3 50.8

In the above example, the logical unit of data consisting of all records before the first trigger would be sorted according to SORT 30.3 22.8, and the second logical unit of data would be sorted according to the last sort control statement SORT 30.3 50.8.

Typically, as is known in the art, the output of the sort goes to sortout. However, the partitioning may result in more than one output being desired, i.e., one for each triggered sort. In order to provide for this support, the sort program would look for existing file definitions. The sort program would provide for specific DDNAMEs (as in MVS), or file definitions, to be used for the output targets, e.g., SRTRIG01 would be the DDNAME for the first output file, SRTRIG02 would be the DDNAME for the second output file, etc. This would provide up to, for instance, 99 output files with associated triggers.

In addition to the above, in another example, a trigger can occur when a comparison of the trigger field, using a conditional operator, to a predetermined value (as described above) is satisfied after a predetermined number of records is retrieved.

It is advantageous to be able to repeat a trigger or to specify a set of triggers with the order of presentation on the control statement being the order of checking. For example, in order to repeat a trigger, the following control statement can be used:
TRIGGER REP (30.3, CH, >100)

In the above example, REP indicates that the trigger condition is to be repeated each time that it is satisfied. Thus, after the trigger condition test is first satisfied, it will be used again and again until the end of the file.

One example of a control statement specifying a set of triggers is as follows:
TRIGGER (30.3, CH, >100, 200, 300, 400)

In the above example, after the first trigger condition test is met, the next trigger value specified would be used. Explicitly, after the first record is encountered, which has a trigger value greater than 100, then 200 would be used for the next conditional test, and so on. The sort program could optionally provide different target data sets for each triggered sort output. In the above example, there may be up to 5 different logical units of work:

1. All records with a trigger field value less than or equal to 100.
2. All records with a trigger field value less than or equal to 200 and greater than 100.
3. All records with a trigger field value less than or equal to 300 and greater than 400.
4. All records with a trigger field value less than or equal to 400 and greater than 300.
5. All records with a trigger field value greater than 400.

In yet further examples, there can be multiple trigger field values. For example:

TRIGGER (30.3, CH, >100) (50.4, PD, <25)

In the above example, the parenthesis indicates that there are two tests, and when the first test is met, the second test will be used to create a data partition. This is different than the major/minor tests described previously. The first trigger conditional test indicated above is the one discussed earlier. Added, is a second trigger conditional test, which looks at a different field with a different data format. In this example, the second trigger is at offset 50, for a length of 4 at a packed decimal value. In this case, the trigger conditional test is met when the 4 byte packed decimal value at offset 50 is less than 25.

The sort control fields used for both triggered sorts would be the same. This, however, may not be the desired processing. It may be the case that two different sorts are needed. In that instance, the TRIGGER control statement and the SORT control statements are paired. The SORT control statement following the TRIGGER control statement provides the pairing. If multiple TRIGGER control statements are specified, once the trigger is satisfied, the next trigger statement is used to partition the sort. For example:
TRIGGER (30.3, CH, >100)
SORT 30.3 22.8
TRIGGER (50.8, PD, <25)
SORT 30.3 50.8 62.4

For the above control statement set, the first trigger results in a sort on the major control field of 30.3 and the minor control field of 22.8. After the second trigger occurs, the sort fields are 30.3 as the major, 50.8 as the secondary minor, and 62.4 as the tertiary minor. The last logical unit of data (i.e., all data read after the last trigger up to end of file) will sort by the fields indicated in the last sort control statement read. In this example: SORT 30.3 50.8 62.4.

Conditional operators are common programming functions and, as shown in the above examples, can be used in the partitioning technique of the present invention. In particular, they are used to partition the data and trigger a sort. The common operators in use are, for instance: equal to, not equal to, less than, equal to or less than, greater than, and equal to or greater than.

In addition to the above examples, it is also possible to use a record count in the partitioning technique of the present invention. In one embodiment, the record count is used in combination with a field value change trigger as an optimization for controlling levels of parallelism, size of logical units of data, etc. Using the field value change trigger may result in widely varying sizes of logical units of data and there are inefficiencies in sorting small logical units of data. Use of record count and field value triggers can reduce these inefficiencies. For example:
TRIGGER (1000) 34.3

For the above control statement specification, the (1000) indicates that after 1000 records have been read, the next change in the trigger field at 34.3 initiates a sort. After the sort, the record count is reset and the trigger field will again be checked after 1000 records. Use of this field directly relates to a specification of LUDSIZE=E1000, which is described below.

The trigger mechanisms described above are used to trigger a sort on buffered data. In another embodiment, however, the triggering may also include an instantiation of a new sort process as an optimization for improving elapsed time. This option would be specified as follows:
COTRIGGER (1000) 30.4

The COTRIGGER indicates that each sort trigger would result in a new sort process. (This is in contrast to TRIGGER (1000) 30.4, in which the sorting was done by the same instance of the sort process.) Each process instance would be passed the appropriate trigger level (the instance number of the sort). This would be used to output the data to the appropriate file. For example, the trigger field value change after 1000 records would result in the first sorted logical unit of data being output to SRTRIG01. The second field value change for the trigger would result in the next logical unit of data being output by the second instance of sort to SRTRIG02.

If there were multiple triggers, the processing of the minor triggers could be done as a cotrigger or as a subordinate trigger to the trigger. For example:

COTRIGGER (1000) 30.4
TRIGGER 44.4

In the implementation of the cotrigger capability, there is a sort control process which reads the data and does not instantiate a sort until the COTRIGGER is satisfied. When the COTRIGGER is satisfied (i.e., the value of field 30.4 changes after 1000 records have been retrieved), a new sort is instantiated, and that sort instance uses the subordinate trigger value as specified by TRIGGER 44.4. For example, when the value of field 44.4 changes, then the instantiated sort performs a sort of the data. This second trigger becomes a major control statement for the instantiated sorts.

In the above example, the trigger condition is when a particular field changes. This is only one example. In other embodiments, the other triggering conditions described herein, as well as others, can be used in the subordinate TRIGGER, as well as in the COTRIGGER statements.

Implementation of multiple sort instances requires the use of shared information for location and access to the buffered records, sorting control options, subordinate triggers, and file allocations for output files. An optimal implementation of the COTRIGGER function is a sort control process which reads the sortin, manages the buffers, partitions the data, fills the buffers, checks the triggers, instantiates the sorts, and manages the instantiations.

Described above are examples of control cards to be used to trigger a sort and to sort the buffered data. In addition to the above control cards, an additional control card can be provided, in accordance with the principles of the present invention, in order to enable a user to specify the estimated or actual size of the largest logical unit of work to be sorted. That is, the user can specify the largest number of data records expected to be retrieved prior to a trigger. This estimated or actual number can then be used by the sort program to determine if all sorting can be done in-memory and/or the amount of sortwork to allocate and/or the size of individual sort strings to be created. An example of this control statement input to the sort program is as follows:

LUDSIZE=x

Actual largest logical unit of data size, where x=the number of records.

LUDSIZE=Ex

Estimated largest logical unit of data size, where x approximates the number of records.

The above is only one embodiment. In other embodiments, sort offerings may elect to use their current size keywords to indicate the size of the logical unit of data whenever the TRIGGER keyword is present.

Described above is a technique for dynamically partitioning data prior to the sorting of the data. In accordance with the principles of the present invention, the data is partitioned into logical units of data and the logical units of data are sorted and outputted prior to the end of the file. This advantageously enhances parallelism, reduces sorting time and reduces the amount of resources necessary to perform the sorts.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A sorting method comprising:
    retrieving, by a sort process, a plurality of data records from a data file, input to said sort process, until a trigger condition is satisfied, wherein said trigger condition comprises one of the following:
    (a) a trigger field within said plurality of data records changes from one value to another value;
    (b) a comparison of said trigger field, using a conditional operator, to a predetermined value;
    (c) said trigger field changes from one value to another value after a predetermined number of data records is retrieved; and
    (d) a comparison of said trigger field, using a conditional operator, to a predetermined value after a predetermined number of data records is retrieved; and
    (e) sorting, by said sort process, at least a portion of said plurality of data records retrieved from said data file, wherein a sort of said at least a portion of said plurality of data records is available for output prior to reaching an end of said data file input to said sort process.

2. A sorting method comprising:
    retrieving, by a first process, a plurality of data records from an input file and passing said plurality of data records to a pipe;
    using a second process to extract from said pipe a portion of said plurality of data records passed to said pipe until a trigger condition is satisfied;
    sorting, by said second process, one or more data records of said portion of said plurality of data records extracted from said pipe; and
    outputting, by said second process, a sort of said one or more data records prior to reaching an end of said data records passed to said pipe, wherein said outputted sort is available for processing by a third process.

3. The method of claim 2, further comprising processing by said third process said outputted sort, wherein said processing by said third process is performed substantially concurrently to said retrieving, using said second process to extract, sorting and outputting.

4. The method of claim 2, wherein said sorting comprises instantiating a sorting instance to perform said sorting and said outputting by said sorting instance.

5. A system for sorting comprising:
    a sort process adapted to retrieve a plurality of data records from a data file, input to said sort process, until a trigger condition is satisfied, wherein said trigger condition comprises one of the following:
    (a) a trigger field within said plurality of data records changes from one value to another value;
    (b) a comparison of said trigger field, using a conditional operator, to a predetermined value;
    (c) said trigger field changes from one value to another value after a predetermined number of data records is retrieved; and
    (d) a comparison of said trigger field, using a conditional operator, to a predetermined value after a predetermined number of data records is retrieved; and (e) said sort process further adapted to sort at least a portion of said plurality of data records retrieved from said data file, wherein a sort of said at least a portion of said plurality of data records is available for output prior to reaching an end of said data file input to said sort process.

* * * * *

UNITED STATES PATENT AND TRADEMARK OFFICE
CERTIFICATE OF CORRECTION

PATENT NO. : 5,813,004
DATED : September 22, 1998
INVENTOR(S) : Meck et al.

It is certified that error appears in the above-identified patent and that said Letters Patent is hereby corrected as shown below:

Col. 8, between lines 45-50, delete "whilelabel/ 1 2-3 nw" and replace with
--whilelabel/ 1 2-3 nw--.

Signed and Sealed this

Second Day of February, 1999

Attest:

Attesting Officer

*Acting Commissioner of Patents and Trademarks*